(12) United States Patent
Chen et al.

(10) Patent No.: US 9,306,474 B2
(45) Date of Patent: Apr. 5, 2016

(54) POWER CONVERSION SYSTEM AND METHOD OF OPERATING THE SAME

(71) Applicant: DELTA ELECTRONICS, INC., Taoyuan County (TW)

(72) Inventors: Hong-Yi Chen, Taoyuan County (TW); Chen-Wei Ku, Taoyuan County (TW); Wei-Lun Hsin, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 26 days.

(21) Appl. No.: 14/448,210

(22) Filed: Jul. 31, 2014

(65) Prior Publication Data

US 2015/0214859 A1 Jul. 30, 2015

(30) Foreign Application Priority Data

Jan. 29, 2014 (TW) .............................. 103103315 A

(51) Int. Cl.
*H02M 7/493* (2007.01)
*H02M 7/5387* (2007.01)
*H02M 1/15* (2006.01)

(52) U.S. Cl.
CPC ............ *H02M 7/53873* (2013.01); *H02M 1/15* (2013.01); *H02M 7/53871* (2013.01)

(58) Field of Classification Search
CPC ..... H02M 1/12; H02M 1/32; H02M 3/33569; H02M 3/1584; H02M 7/493; H02M 7/49; H02M 7/537
USPC ........................ 363/16, 40, 56.01, 65, 71, 131
See application file for complete search history.

(56) References Cited

U.S. PATENT DOCUMENTS 6,697,271 B2 * 2/2004 Corzine ................ H02M 7/487
363/41
7,872,887 B2 * 1/2011 Nishio .................. H02M 7/487
323/906
7,957,168 B2 * 6/2011 Zacharias ............... H02M 1/44
363/132

(Continued)

FOREIGN PATENT DOCUMENTS

CN 100384072 4/2008
CN 102195507 9/2011

(Continued)

OTHER PUBLICATIONS

Office Action dated Nov. 13, 2014 from corresponding No. TW 103103315.
Extended European Search Report dated Dec. 19, 2014 from corresponding No. EP 14176050.4.

*Primary Examiner* — Adolf Berhane
(74) *Attorney, Agent, or Firm* — Hauptman Ham, LLP

(57) ABSTRACT

A power conversion system mainly includes an input capacitor bank, a first conversion circuit, a second conversion circuit, and a control circuit. The input capacitor bank has a first capacitor and a second capacitor. The first capacitor and the second capacitor are connected to a neutral point and receive a DC input voltage. The first conversion circuit is connected in parallel to the input capacitor bank, and has a first branch, a second branch, and a first auxiliary branch. The second conversion circuit is connected in parallel to the input capacitor bank, and has a third branch, a fourth branch, and a second auxiliary branch. The control circuit produces a plurality of control signals to correspondingly control the first conversion circuit and the second conversion circuit so as to reduce leakage current caused by parasitic capacitance voltage.

18 Claims, 12 Drawing Sheets

(56) References Cited

U.S. PATENT DOCUMENTS

| | | | |
|---|---|---|---|
| 8,564,973 B2 | 10/2013 | Zhang | |
| 8,749,210 B1 * | 6/2014 | Nakao | H02M 1/4225 323/224 |
| 8,842,448 B2 * | 9/2014 | Ye | H02M 3/33569 363/21.02 |
| 8,848,405 B2 * | 9/2014 | Temesi | H02M 7/483 363/131 |
| 8,885,375 B2 | 11/2014 | Ku et al. | |

FOREIGN PATENT DOCUMENTS

| | | |
|---|---|---|
| CN | 102223101 | 10/2011 |
| EP | 2787616 A2 | 10/2014 |
| TW | 201304385 A | 1/2013 |
| WO | 2012163235 A1 | 12/2012 |

\* cited by examiner

POWER CONVERSION SYSTEM AND METHOD OF OPERATING THE SAME

BACKGROUND

1. Technical Field

The present disclosure relates generally to a power conversion system and a method of operating the same, and more particularly to a power conversion system with a dual-buck inverter and a method of operating the same.

2. Description of Related Art

Reference is made to FIG. 1 which is a block diagram of a related art dual-buck inverter. The dual-buck inverter receives a DC input voltage Vdc, and converts the DC input voltage Vdc into an AC output voltage Vac. The dual-buck inverter includes two buck circuits, namely, a first buck circuit BC1 and a second buck circuit BC2. The first buck circuit BC1 mainly has a first bridge arm Lg1a and a second bridge arm Lg2a. The first bridge arm Lg1a has a first switch S1a and a first diode D1a connected in series to the first switch S1a. The second bridge arm Lg2a has a second switch S2a and a second diode D2a connected in series to the second switch S2a. The second buck circuit BC2 mainly has a third bridge arm Lg3a and a fourth bridge arm Lg4a. The third bridge arm Lg3a has a third switch S3a and a third diode D3a connected in series to the third switch S3a. The fourth bridge arm Lg4a has a fourth switch S4a and a fourth diode D4a connected in series to the fourth switch S4a. Also, the first buck circuit BC1 and the second buck circuit BC2 are connected in parallel to an input capacitor C1a.

Reference is made to FIG. 2 which is a schematic waveform graph of driving signals for controlling the prior art dual-buck inverter. A driving signal generating circuit (not shown) is provided to produce a plurality of control signals, namely a first control signal Sca1, a second control signal Sca2, a third control signal Sca3, and a fourth control signal Sca4 to correspondingly control the first switch S1a, the second switch S2a, the third switch S3a, and the fourth switch S4a.

The first control signal Sca1 and the second control signal Sca2 are a complementary low-frequency signal pair. When the AC output voltage Vac is under a positive half-cycle operation (during a time interval between time t0 and time t1), the first control signal Sca1 turns on the first switch S1a and the second control signal Sca2 turns off the second switch S2a, and the third control signal Sca3 turns off the third switch S3a and the fourth control signal Sca4 controls the fourth switch S4a in the high-frequency switching manner. When the AC output voltage Vac is under a negative half-cycle operation (during a time interval between time t1 and time t2), the first control signal Sca1 turns off the first switch S1a and the second control signal Sca2 turns on the second switch S2a, and the third control signal Sca3 controls the third switch S3a in the high-frequency switching manner and the fourth control signal Sca4 turns off the fourth switch S4a.

However, the leakage current Icp1, Icp2 would be rapidly changed once the parasitic capacitance voltages of the parasitic capacitances Cp1, Cp2 significantly change because of the large variation of the AC output voltage Vac of the dual-buck inverter. That is, the leakage current gets larger as the variation of the parasitic capacitance voltage gets larger.

Accordingly, it is desirable to provide a power conversion system and a method of operating the same to control a dual-buck inverter having two conversion circuits and two filtering circuits so as to provide energy-storing and energy-releasing loops of output inductors and connect the filtering circuits to a neutral point at a DC input side, thus significantly reducing leakage current of a DC input voltage caused by parasitic capacitance voltage.

SUMMARY

An object of the present disclosure is to provide a power conversion system to solve the above-mentioned problems. Accordingly, the power conversion system converts a DC input voltage into an AC output voltage. The power conversion system includes an input capacitor bank, a first conversion circuit, a second conversion circuit, a first filtering circuit, a second filtering circuit, and a control circuit. The input capacitor bank has a first capacitor and a second capacitor, and the first capacitor and the second capacitor are connected to a neutral point and receive the DC input voltage. The first conversion circuit is connected in parallel to the input capacitor bank. The second conversion circuit is connected in parallel to the input capacitor bank. The first filtering circuit is connected between the first conversion circuit and the second conversion circuit, and an output side of the first filtering circuit is connected to the neutral point. The second filtering circuit is connected between the first conversion circuit and the second conversion circuit, and an output side of the second filtering circuit is connected to the neutral point. The control circuit produces a plurality of control signals to correspondingly control the first conversion circuit and the second conversion circuit, thus reducing leakage current of the DC input voltage caused by parasitic capacitance voltage.

Another object of the present disclosure is to provide a method of operating a power conversion system. Accordingly, the power conversion system converts a DC input voltage into an AC output voltage, and the method includes following steps: (a) providing an input capacitor bank to receive the DC input voltage; wherein the input capacitor bank has a first capacitor and a second capacitor, and the first capacitor and the second capacitor are connected to a neutral point; (b) providing a first conversion circuit connected in parallel to the input capacitor bank; (c) providing a second conversion circuit connected in parallel to the input capacitor bank; (d) providing a first filtering circuit connected between the first conversion circuit and the second conversion circuit; wherein an output side of the first filtering circuit is connected to the neutral point; (e) providing a second filtering circuit connected between the first conversion circuit and the second conversion circuit; wherein an output side of the second filtering circuit is connected to the neutral point; and (f) providing a control circuit to produce a plurality of control signals to correspondingly control the first conversion circuit and the second conversion circuit, thus reducing leakage current of the DC input voltage caused by parasitic capacitance voltage.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
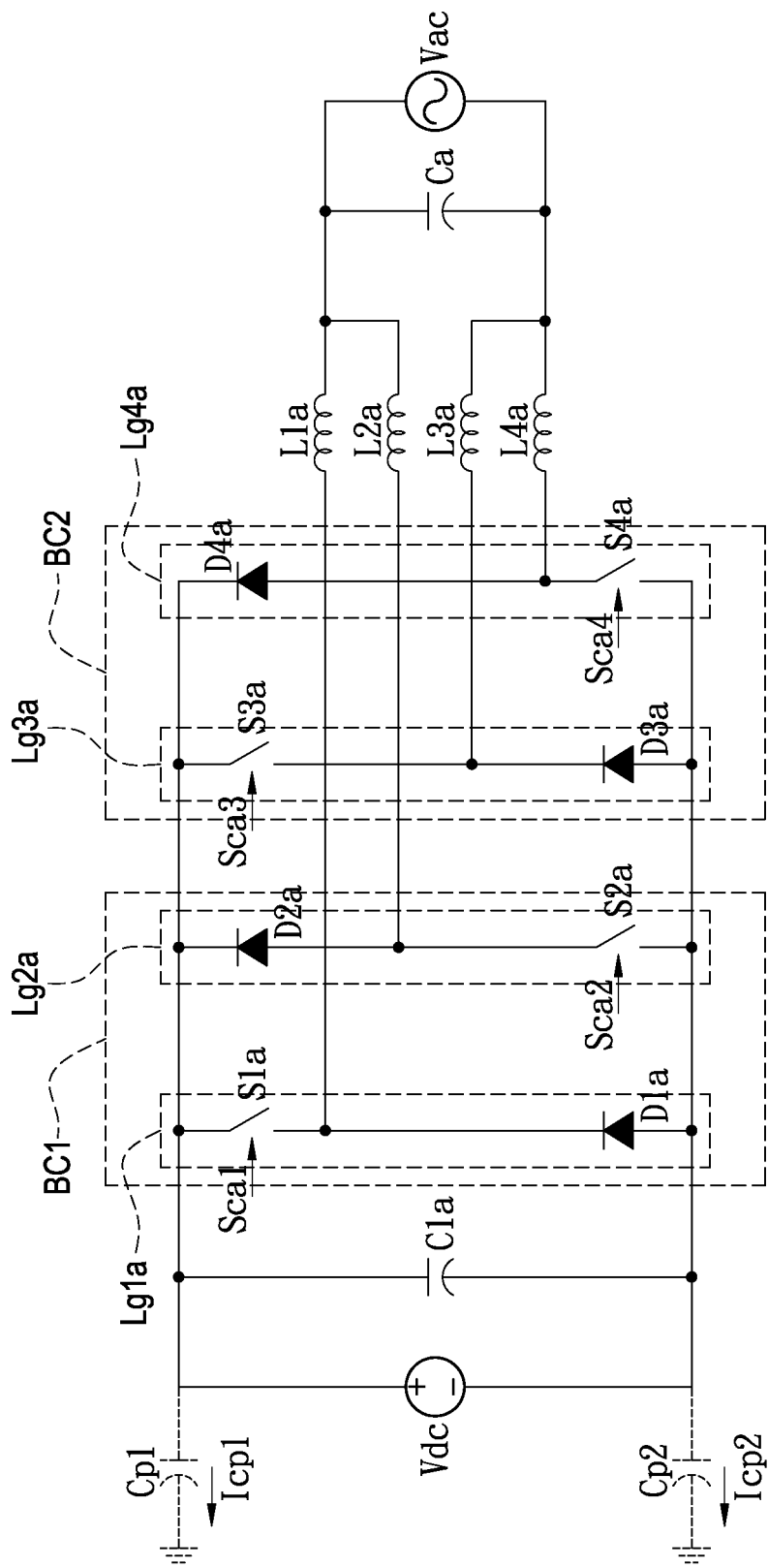
FIG. 1 is a block diagram of a related art dual-buck inverter.
Figure 2:
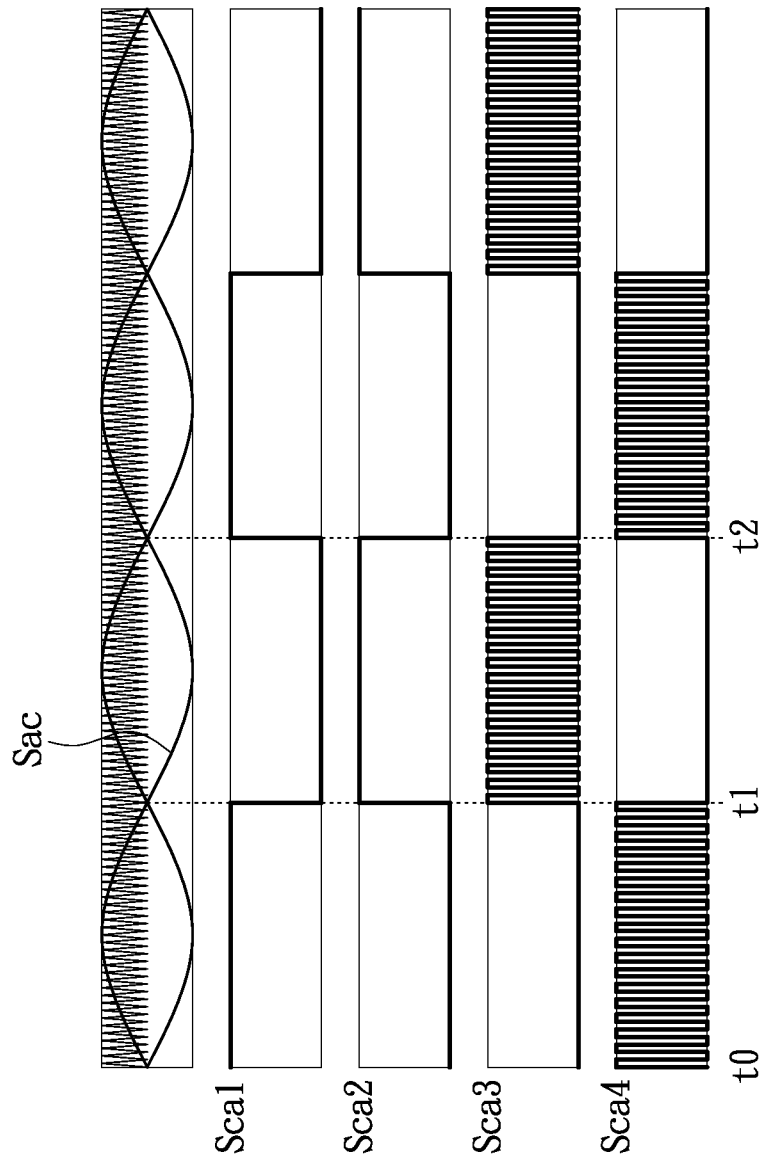
FIG. 2 is a schematic waveform graph of driving signals for controlling the prior art dual-buck inverter.

Reference will now be made to the drawing figures to describe the present invention in detail.

Figure 3:
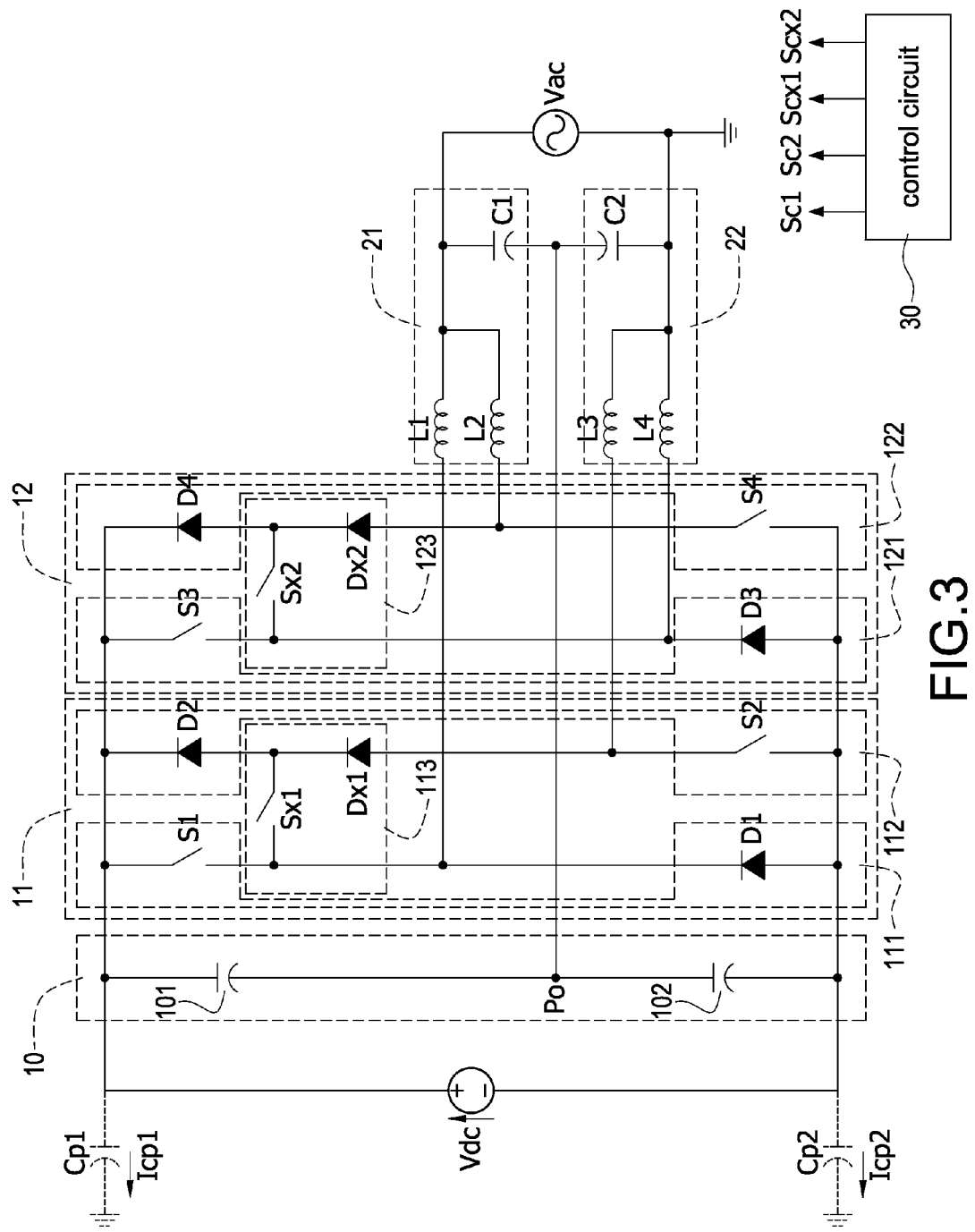
FIG. 3 is a circuit diagram of a power conversion system according to a first embodiment of the present disclosure.

Reference is made to FIG. 3 which is a circuit diagram of a power conversion system according to a first embodiment of the present disclosure. The power conversion system can be a solar photovoltaic power conversion system. The power conversion system is provided to convert a DC input voltage Vdc into an AC output voltage Vac. The power conversion system includes an input capacitor bank 10, a first conversion circuit 11, a second conversion circuit 12, a first filtering circuit 21, a second filtering circuit 22, and a control circuit 30. The input capacitor bank 10 has a first capacitor 101 and a second capacitor 102. The first capacitor 101 and the second capacitor 102 are connected to a neutral point Po to receive the DC input voltage Vdc. In particular, the first capacitor 101 and the second capacitor 102 are connected to the neutral point Po to maintain a voltage across the first capacitor 101 and a voltage across the second capacitor 102 are equal to a half of the DC input voltage Vdc.

The first conversion circuit 11 is connected in parallel to the input capacitor bank 10, and the first conversion circuit 11 has a first branch 111, a second branch 112, and a first auxiliary branch 113. The first branch 111 is composed of a first power switch S1 and a first diode D1 connected to the first power switch S1. The second branch 112 is composed of a second power switch S2 and a second diode D2 connected to the second power switch S2. The first auxiliary branch 113 is composed of a first auxiliary power switch Sx1 and a first auxiliary diode Dx1 connected to the first auxiliary power switch Sx1. The first auxiliary branch 113 is connected between the first branch 111 and the second branch 112. The control circuit 30 produces a first control signal Sc1 to control the first power switch S1 and the second power switch S2, and produces a first auxiliary control signal Scx1 to control the first auxiliary power switch Sx1.

The second conversion circuit 12 is connected in parallel to the input capacitor bank 10, and the second conversion circuit 12 has a third branch 121, a fourth branch 122, and a second auxiliary branch 123. The third branch 121 is composed of a third power switch S3 and a third diode D3 connected to the third power switch S3. The fourth branch 122 is composed of a fourth power switch S4 and a fourth diode D4 connected to the fourth power switch S4. The second auxiliary branch 123 is composed of a second auxiliary power switch Sx2 and a second auxiliary diode Dx2 connected to the second auxiliary power switch Sx2. The second auxiliary branch 123 is connected between the third branch 121 and the fourth branch 122. The control circuit 30 produces a second control signal Sc2 to control the third power switch S3 and the fourth power switch S4, and produces a second auxiliary control signal Scx2 to control the second auxiliary power switch Sx2.

The first filtering circuit 21 is connected between the first conversion circuit 11 and the second conversion circuit 12, and an output side of the first filtering circuit 21 is connected to the neutral point Po. The first filtering circuit 21 includes a first output inductor L1 with a first terminal and a second terminal, a second output inductor L2 with a first terminal and a second terminal, and a first output capacitor C1 with a first terminal and a second terminal. The first terminal of the first output inductor L1 is connected to the first terminal of the second output inductor L2 and then is connected to the first terminal of the first output capacitor C1. The second terminal of the first output inductor L1 is connected to the first power switch S1, the first auxiliary power switch Sx1, and the first diode D1. The second terminal of the second output inductor L2 is connected to the fourth power switch S4 and the second auxiliary diode Dx2. The second terminal of the first output capacitor C1 is connected to the neutral point Po.

The second filtering circuit 22 is connected between the first conversion circuit 11 and the second conversion circuit 12, and an output side of the second filtering circuit 22 is connected to the neutral point Po. The second filtering circuit 22 includes a third output inductor L3 with a first terminal and a second terminal, a fourth output inductor L4 with a first terminal and a second terminal, and a second output capacitor C2 with a first terminal and a second terminal. The first terminal of the third output inductor L3 is connected to the first terminal of the fourth output inductor L4 and then is connected to the first terminal of the second output capacitor C2. The second terminal of the fourth output inductor L4 is connected to the third power switch S3, the second auxiliary power switch Sx2, and the third diode D3. The second terminal of the third output inductor L3 is connected to the second power switch S2 and the first auxiliary diode Dx1. The second terminal of the second output capacitor C2 is connected to the neutral point Po.

In particular, the AC output voltage Vac is outputted between the first terminal of the first output capacitor C1 and the first terminal of the second output capacitor C2. The control circuit 30 produces a plurality of control signals to correspondingly control the first conversion circuit 11 and the second conversion circuit 12, thus reducing leakage current of the DC input voltage Vdc caused by parasitic capacitance voltage. The detailed operation of the power conversion system will be described hereinafter as follows.

Figure 4:
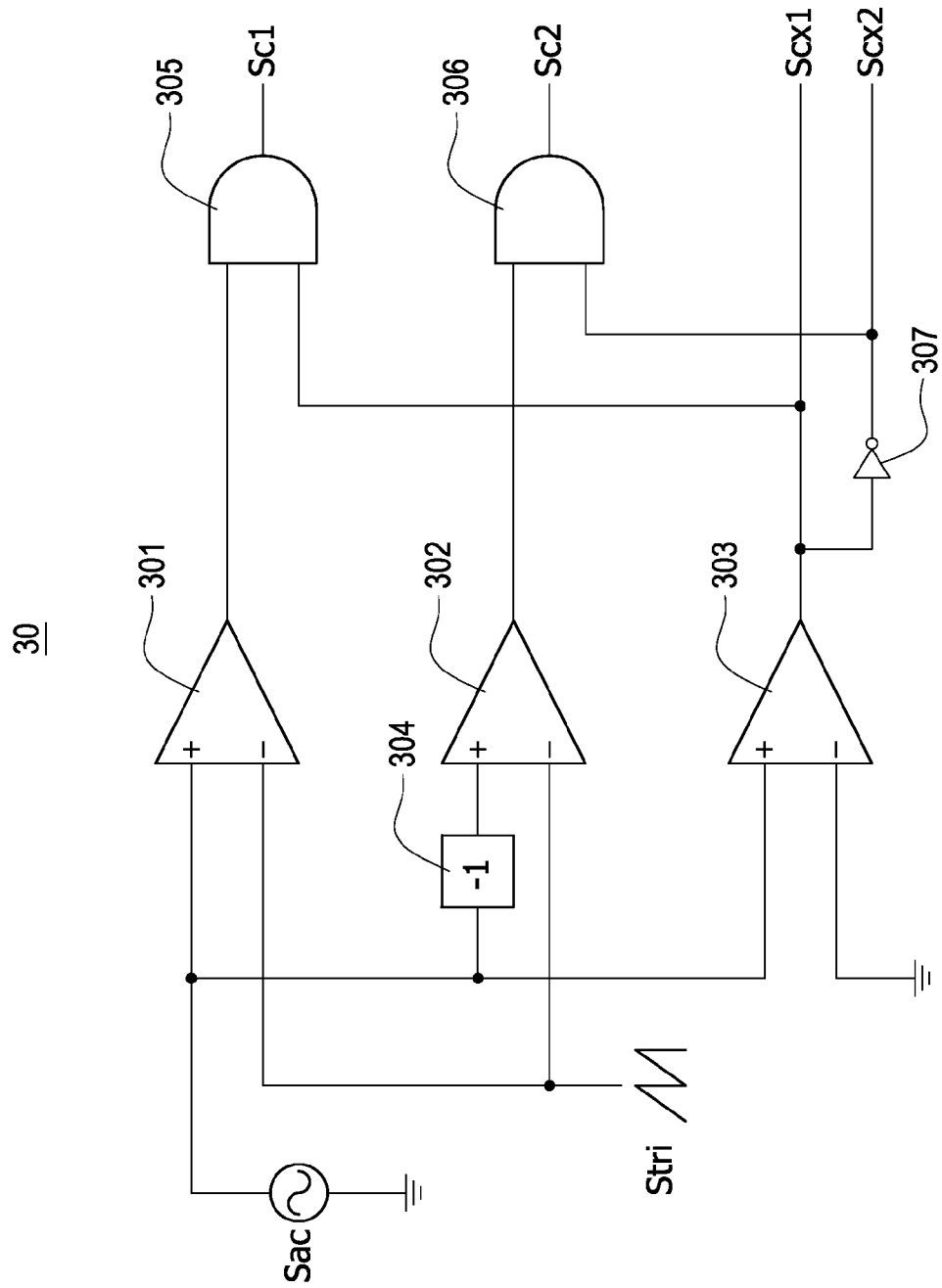
FIG. 4 is a schematic circuit diagram of a control circuit of the power conversion system according to the present disclosure.

Reference is made to FIG. 4 which is a schematic circuit diagram of a control circuit of the power conversion system according to the present disclosure. The control circuit 30 includes a signal inverting unit 304, a first AND gate unit 305, a second AND gate unit 306, a NOT gate unit 307, a first comparison unit 301, a second comparison unit 302, and a third comparison unit 303. The first comparison unit 301 has an inverting input terminal, a non-inverting input terminal, and an output terminal. The non-inverting input terminal receives an AC output voltage signal Sac and the inverting input terminal receives a triangular carrier signal Stri. The output terminal outputs a first output signal So1. The second comparison unit 302 has an inverting input terminal, a non-inverting input terminal, and an output terminal. The non-inverting input terminal is connected to the signal inverting unit 304 to receive the AC output voltage signal Sac and the inverting input terminal receives the triangular carrier signal Stri. The output terminal outputs a second output signal So2. The third comparison unit 303 has an inverting input terminal, a non-inverting input terminal, and an output terminal. The non-inverting input terminal receives the AC output voltage signal Sac and the inverting input terminal is grounded. The output terminal outputs the first auxiliary control signal Scx1 and the output terminal is connected to the NOT gate unit 307 to output the second auxiliary control signal Scx2.

The first AND gate unit 305 receives the first output signal So1 and the first auxiliary control signal Scx1 to output the first control signal Sc1. The second AND gate unit 306 receives the second output signal So2 and the second auxiliary control signal Scx2 to output the second control signal Sc2. In particular, the triangular carrier signal Stri is a high-frequency carrier signal. Especially, the switching frequency of the PWM signal is equal to the frequency of the triangular carrier signal Stri. In addition, the frequency of converting the first auxiliary control signal Scx1 and the second auxiliary control signal Scx2 is equal to the utility frequency of the AC output voltage signal Sac.

Figure 5:
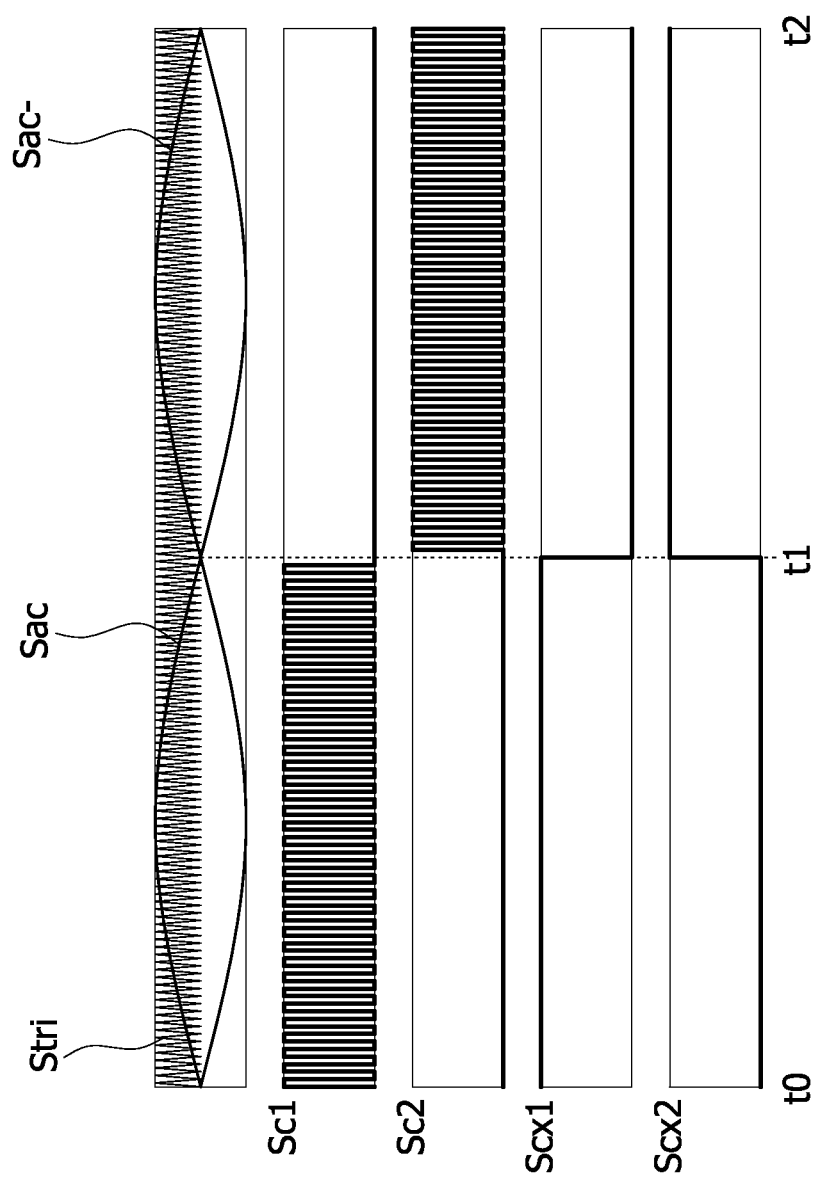
FIG. 5 is a schematic waveform graph of switch control signals for controlling the power conversion system according to the present disclosure.

Reference is made to FIG. 5 which is a schematic waveform graph of switch control signals for controlling the power conversion system according to the present disclosure. When the AC output voltage Vac is under a positive half-cycle operation (during a time interval between time t0 and time t1), the first control signal Sc1 is a high-frequency switching signal, the second control signal Sc2 is a low-level signal, the first auxiliary control signal Scx1 is a low-frequency high-level signal, and the second auxiliary control signal Scx2 is a low-frequency low-level signal. When the AC output voltage Vac is under a negative half-cycle operation (during a time interval between time t1 and time t2), the first control signal Sc1 is a low-level signal, the second control signal Sc2 is a high-frequency switching signal, the first auxiliary control signal Scx1 is a low-frequency low-level signal, and the second auxiliary control signal Scx2 is a low-frequency high-level signal. In particular, the first control signal Sc1 and the second control signal Sc2 are a PWM signal, respectively. In addition, the first auxiliary control signal Scx1 and the second auxiliary control signal Scx2 are the complementary low-frequency signals. That is, when the first auxiliary control signal Scx1 is high-level, the second auxiliary control signal Scx2 is level; when the first auxiliary control signal Scx1 is low-level, the second auxiliary control signal Scx2 is high-level.

Figure 6:
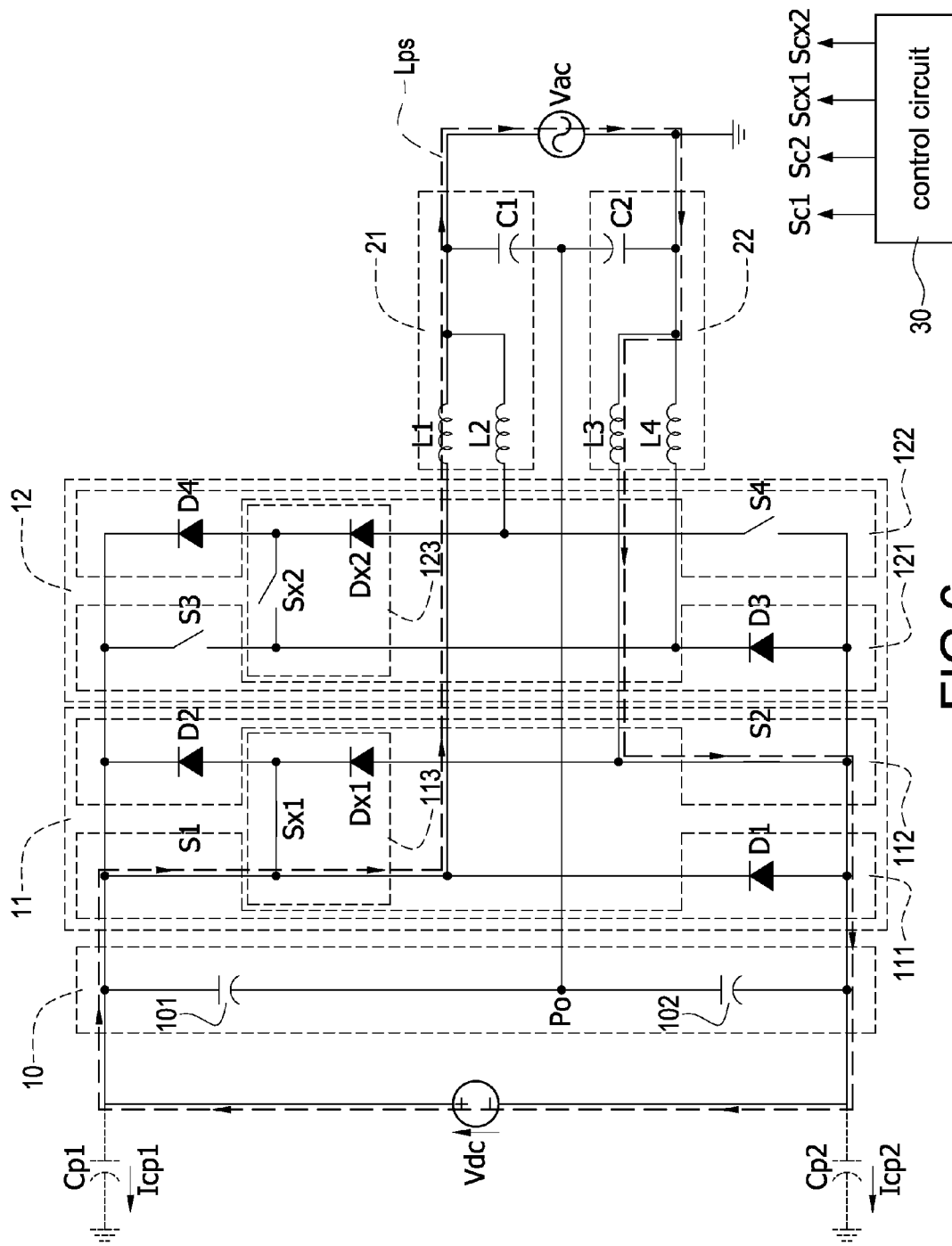
FIG. 6 is a circuit diagram of the power conversion system under a positive half-cycle energy-storing operation according to the first embodiment of the present disclosure.

Reference is made to FIG. 6 which is a circuit diagram of the power conversion system under a positive half-cycle energy-storing operation according to the first embodiment of the present disclosure. When the AC output voltage Vac is under the positive half-cycle operation and the first output inductor L1 and the third output inductor L3 are under an energy-storing operation because the first power switch S1 and the second power switch S2 are turned on by the first control signal Sc1 in the high-frequency switching manner and the first auxiliary power switch Sx1 is turned on by the first auxiliary control signal Scx1 in the low-frequency high-level manner, a positive half-cycle energy-storing loop Lps is sequentially formed by the DC input voltage Vdc, the first power switch S1, the first output inductor L1, the AC output voltage Vac, the third output inductor L3, the second power switch S2, and the DC input voltage Vdc.

Figure 7:
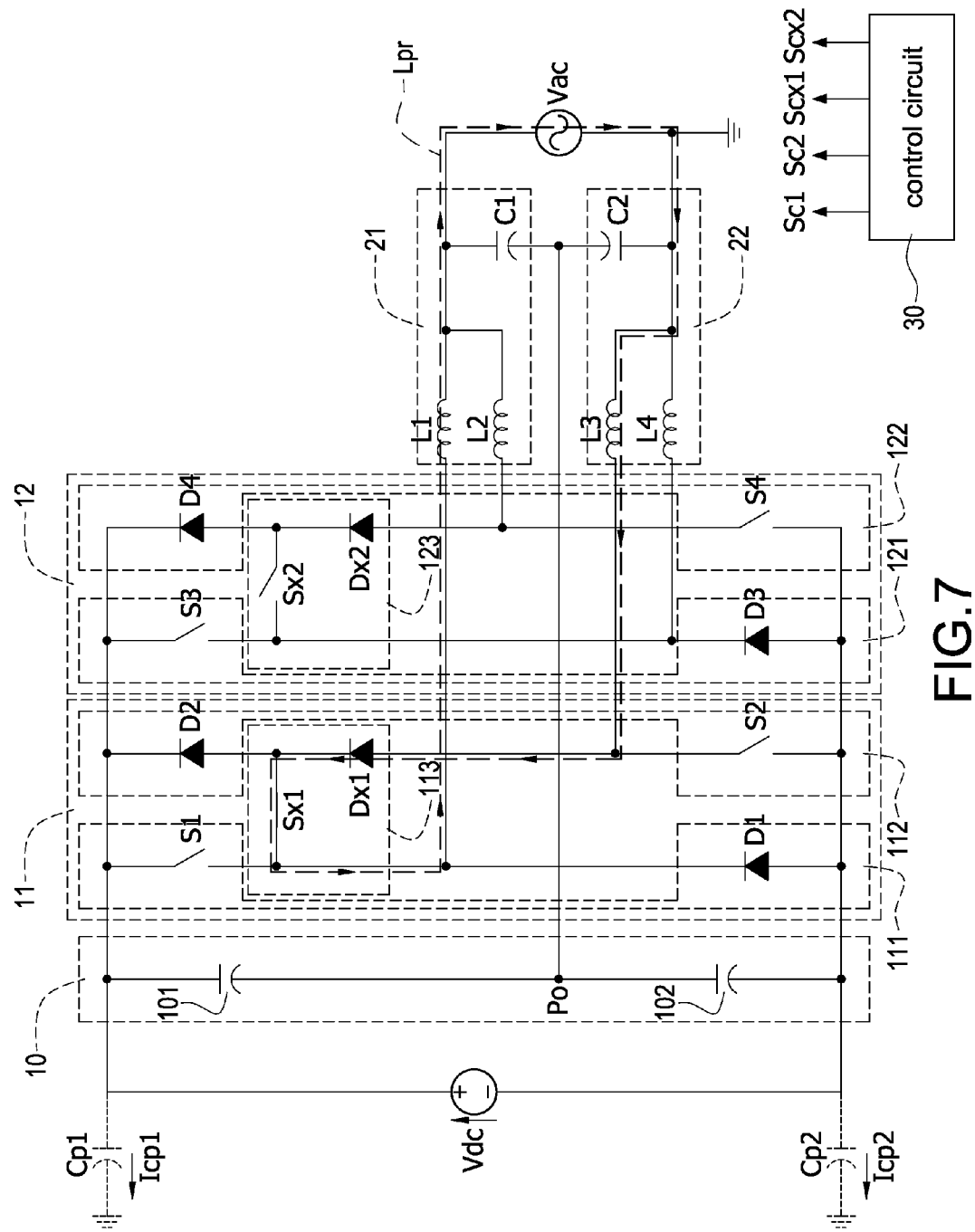
FIG. 7 is a circuit diagram of the power conversion system under a positive half-cycle energy-releasing operation according to the first embodiment of the present disclosure.

Reference is made to FIG. 7 which is a circuit diagram of the power conversion system under a positive half-cycle energy-releasing operation according to the first embodiment of the present disclosure. When the AC output voltage Vac is under the positive half-cycle operation and the first output inductor L1 and the third output inductor L3 are under an energy-releasing operation because the first power switch S1 and the second power switch S2 are turned off by the first control signal Sc1 in the high-frequency switching manner and the first auxiliary power switch Sx1 is turned on by the first auxiliary control signal Scx1 in the low-frequency high-level manner, a positive half-cycle energy-releasing loop Lpr is sequentially formed by the first output inductor L1, the AC output voltage Vac, the third output inductor L3, the first auxiliary diode Dx1, the first auxiliary power switch Sx1, and the first output inductor L1.

Figure 8:
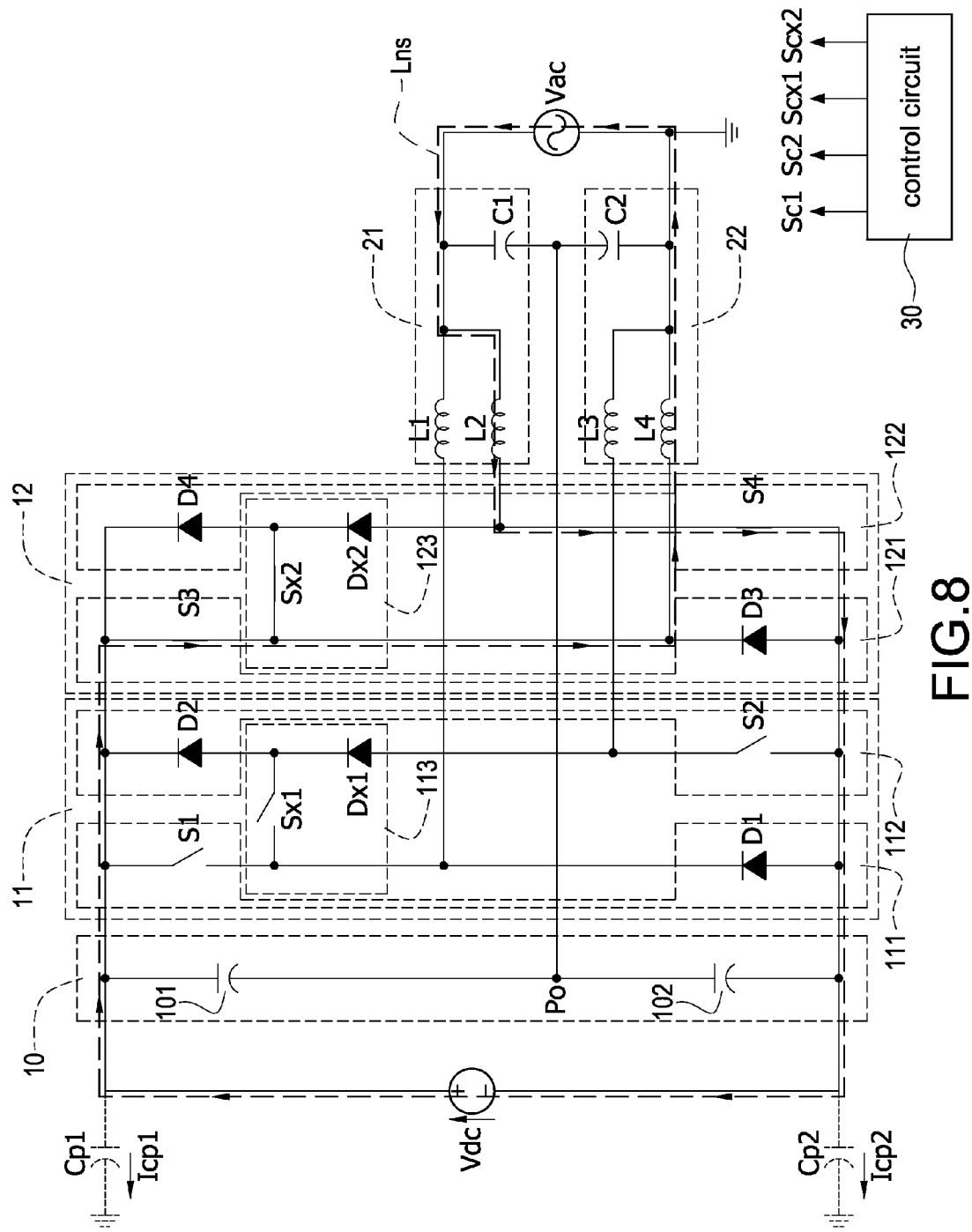
FIG. 8 is a circuit diagram of the power conversion system under a negative half-cycle energy-storing operation according to the first embodiment of the present disclosure.

Reference is made to FIG. 8 which is a circuit diagram of the power conversion system under a negative half-cycle energy-storing operation according to the first embodiment of the present disclosure. When the AC output voltage Vac is under the negative half-cycle operation and the second output inductor L2 and the fourth output inductor L4 are under an energy-storing operation because the third power switch S3 and the fourth power switch S4 are turned on by the second control signal Sc2 in the high-frequency switching manner and the second auxiliary power switch Sx2 is turned on by the second auxiliary control signal Scx2 in the low-frequency high-level manner, a negative half-cycle energy-storing loop Lns is sequentially formed by the DC input voltage Vdc, the third power switch S3, the fourth output inductor L4, the AC output voltage Vac, the second output inductor L2, the fourth power switch S4, and the DC input voltage Vdc.

Figure 9:
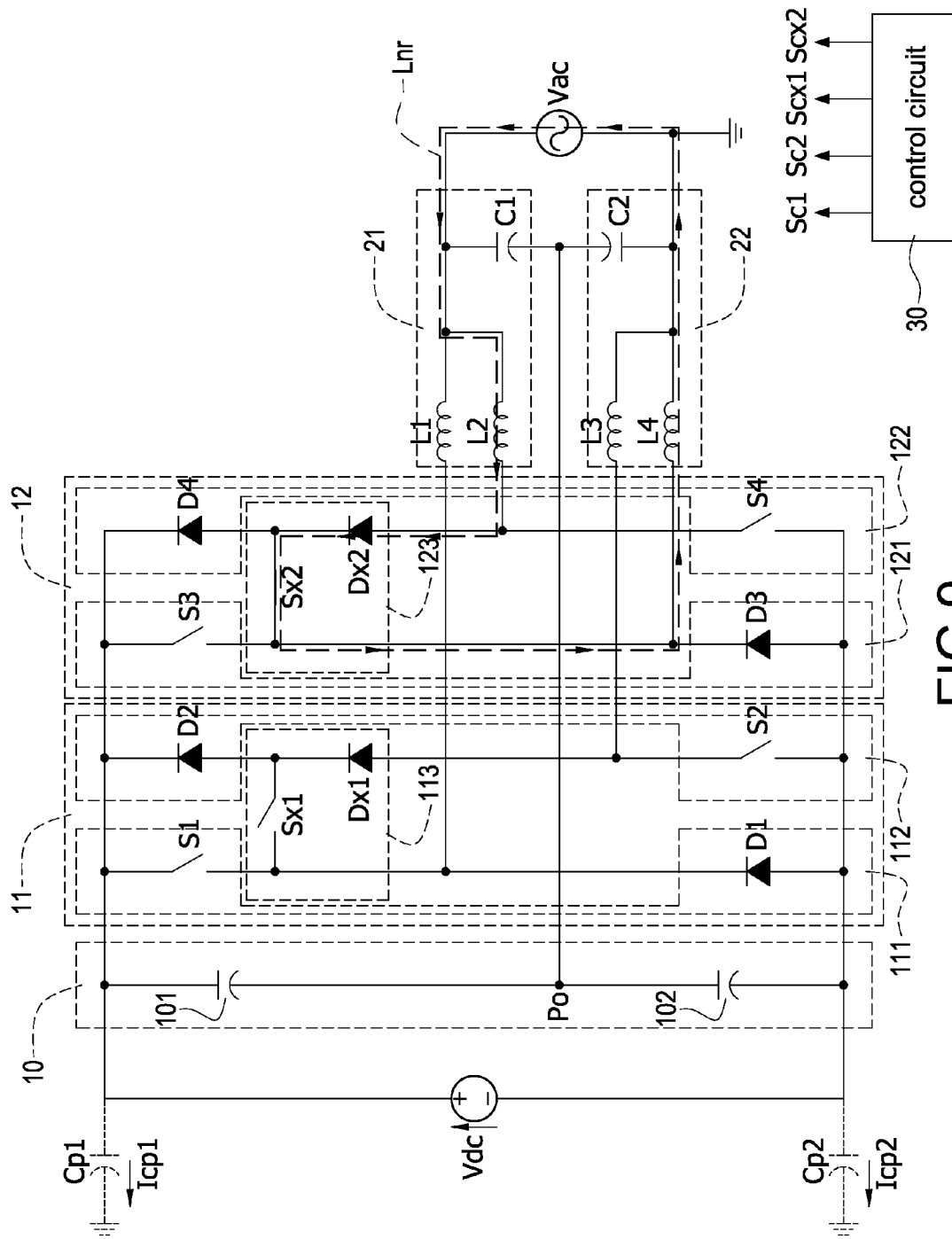
FIG. 9 is a circuit diagram of the power conversion system under a negative half-cycle energy-releasing operation according to the first embodiment of the present disclosure.

Reference is made to FIG. 9 which is a circuit diagram of the power conversion system under a negative half-cycle energy-releasing operation according to the first embodiment of the present disclosure. When the AC output voltage Vac is under the negative half-cycle operation and the second output inductor L2 and the fourth output inductor L4 are under an energy-releasing operation because the third power switch S3 and the fourth power switch S4 are turned off by the second control signal Sc2 in the high-frequency switching manner and the second auxiliary power switch Sx2 is turned on by the second auxiliary control signal Scx2 in the low-frequency high-level manner, a negative half-cycle energy-releasing loop Lnr is sequentially formed by the fourth output inductor L4, the AC output voltage Vac, the second output inductor L2, the second auxiliary diode Dx2, the second auxiliary power switch Sx2, and the fourth output inductor L4.

Figure 10:
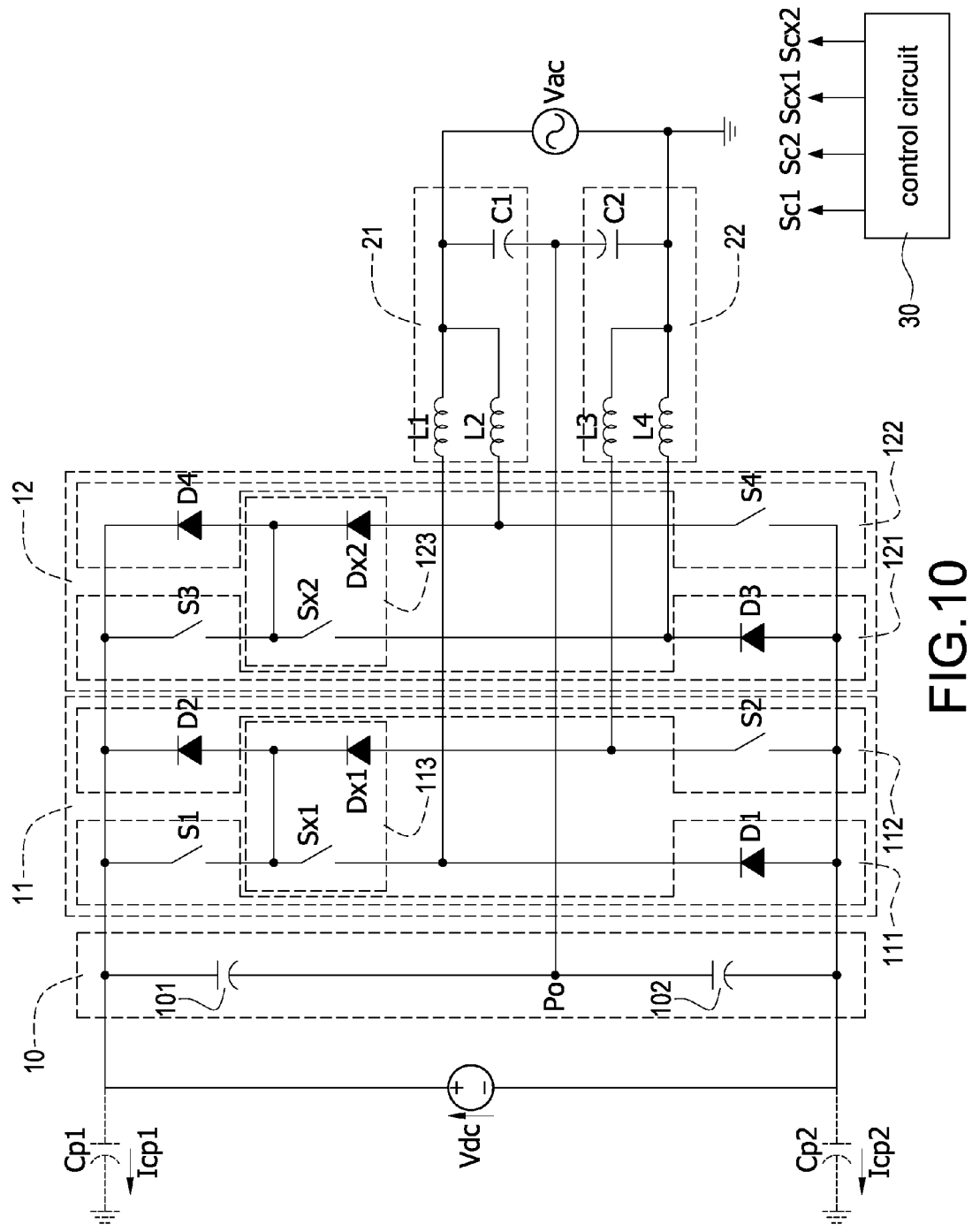
FIG. 10 is a circuit diagram of a power conversion system according to a second embodiment of the present disclosure.

Reference is made to FIG. 10 which is a circuit diagram of a power conversion system according to a second embodiment of the present disclosure. The major difference between the second embodiment and the first embodiment (as shown in FIG. 3) is that the connection relationship of the first auxiliary branch 113 composed of connecting the first auxiliary power switch Sx1 to the first auxiliary diode Dx1 and the second auxiliary branch 123 composed of connecting the second auxiliary power switch Sx2 to the second auxiliary diode Dx2 is changed. However, the first auxiliary control signal Scx1 and the second auxiliary control signal Scx2 are provided to control the corresponding switches so as to implement the same circuit performance. When the AC output voltage Vac is under the positive half-cycle operation and the first output inductor L1 and the third output inductor L3 are under an energy-storing operation, a positive half-cycle energy-storing loop is sequentially formed by the DC input voltage Vdc, the first power switch S1, the first auxiliary power switch Sx1, the first output inductor L1, the AC output voltage Vac, the third output inductor L3, the second power switch S2, and the DC input voltage Vdc. When the AC output voltage Vac is under the positive half-cycle operation and the first output inductor L1 and the third output inductor L3 are under an energy-releasing operation, a positive half-cycle energy-releasing loop is sequentially formed by the first output inductor L1, the AC output voltage Vac, the third output inductor L3, the first auxiliary diode Dx1, the first auxiliary power switch Sx1, and the first output inductor L1.

When the AC output voltage Vac is under the negative half-cycle operation and the second output inductor L2 and the fourth output inductor L4 are under an energy-storing operation, a negative half-cycle energy-storing loop is sequentially formed by the DC input voltage Vdc, the third power switch S3, the second auxiliary power switch Sx2, the fourth output inductor L4, the AC output voltage Vac, the second output inductor L2, the fourth power switch S4, and the DC input voltage Vdc. When the AC output voltage Vac is under the negative half-cycle operation and the second output inductor L2 and the fourth output inductor L4 are under an energy-releasing operation, a negative half-cycle energy-releasing loop is sequentially formed by the fourth output inductor L4, the AC output voltage Vac, the second output inductor L2, the second auxiliary diode Dx2, the second auxiliary power switch Sx2, and the fourth output inductor L4.

Figure 11:
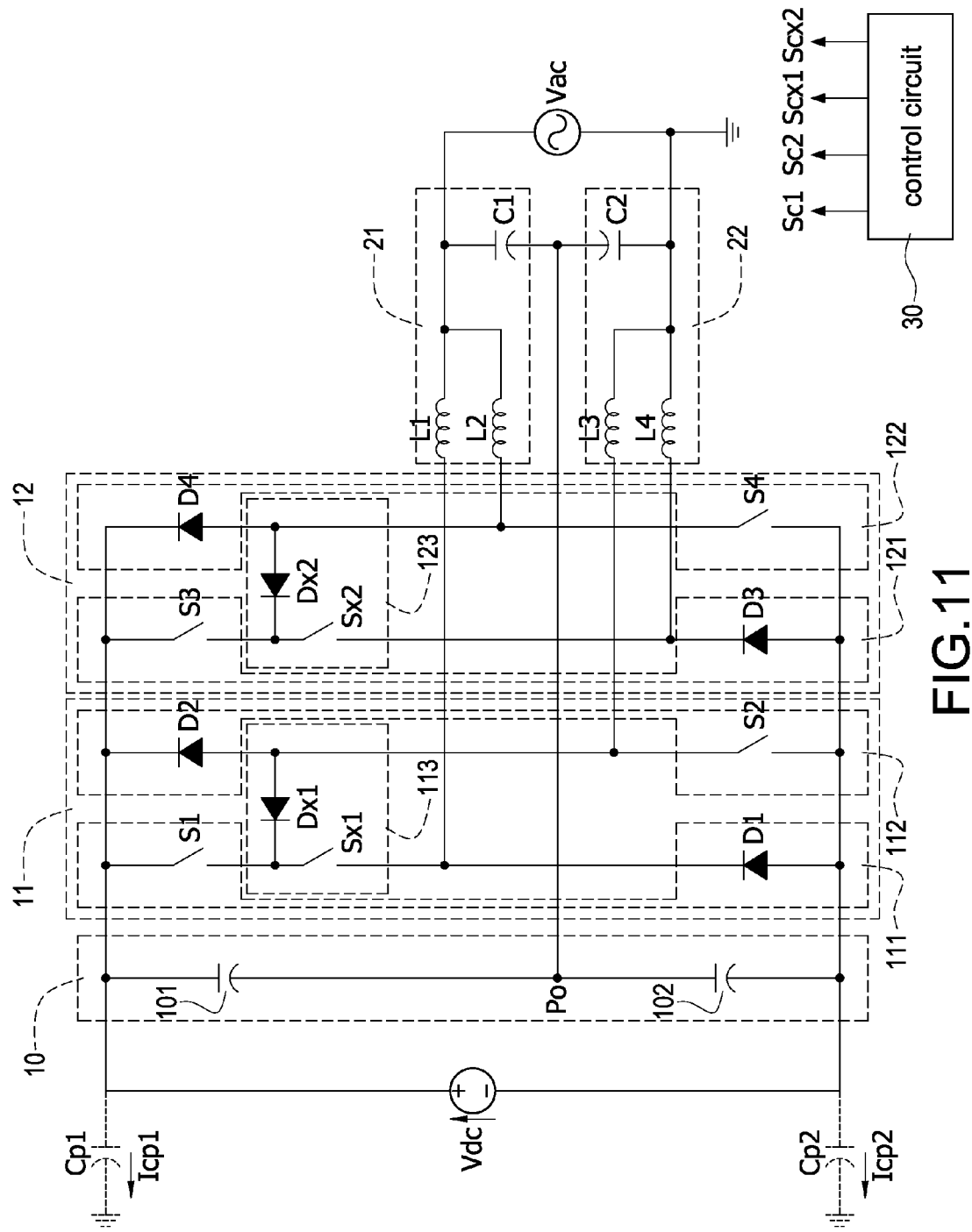
FIG. 11 is a circuit diagram of a power conversion system according to a third embodiment of the present disclosure.

Reference is made to FIG. 11 which is a circuit diagram of a power conversion system according to a third embodiment of the present disclosure. The major difference between the third embodiment and the first embodiment (as shown in FIG. 3) is that the connection relationship of the first auxiliary branch 113 composed of connecting the first auxiliary power switch Sx1 to the first auxiliary diode Dx1 and the second auxiliary branch 123 composed of connecting the second auxiliary power switch Sx2 to the second auxiliary diode Dx2 is changed. However, the first auxiliary control signal Scx1 and the second auxiliary control signal Scx2 are provided to control the corresponding switches so as to implement the same circuit performance.

When the AC output voltage Vac is under the positive half-cycle operation and the first output inductor L1 and the third output inductor L3 are under an energy-storing operation, a positive half-cycle energy-storing loop is sequentially formed by the DC input voltage Vdc, the first power switch S1, the first auxiliary power switch Sx1, the first output inductor L1, the AC output voltage Vac, the third output inductor L3, the second power switch S2, and the DC input voltage Vdc. When the AC output voltage Vac is under the positive half-cycle operation and the first output inductor L1 and the third output inductor L3 are under an energy-releasing operation, a positive half-cycle energy-releasing loop is sequentially formed by the first output inductor L1, the AC output voltage Vac, the third output inductor L3, the first auxiliary diode Dx1, the first auxiliary power switch Sx1, and the first output inductor L1.

When the AC output voltage Vac is under the negative half-cycle operation and the second output inductor L2 and the fourth output inductor L4 are under an energy-storing operation, a negative half-cycle energy-storing loop is sequentially formed by the DC input voltage Vdc, the third power switch S3, the second auxiliary power switch Sx2, the fourth output inductor L4, the AC output voltage Vac, the second output inductor L2, the fourth power switch S4, and the DC input voltage Vdc. When the AC output voltage Vac is under the negative half-cycle operation and the second output inductor L2 and the fourth output inductor L4 are under an energy-releasing operation, a negative half-cycle energy-releasing loop is sequentially formed by the fourth output inductor L4, the AC output voltage Vac, the second output inductor L2, the second auxiliary diode Dx2, the second auxiliary power switch Sx2, and the fourth output inductor L4.

Figure 12:
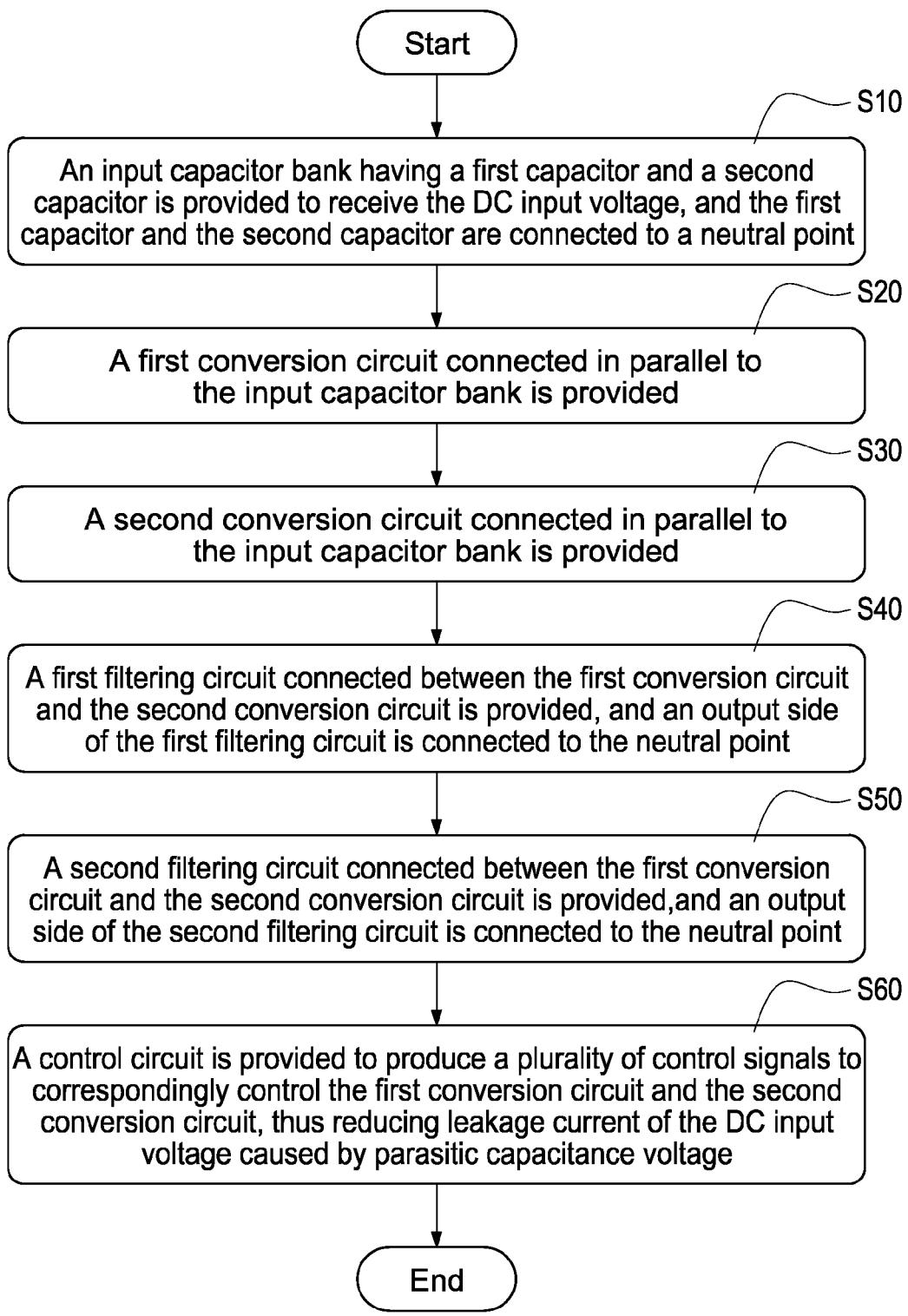
FIG. 12 is a flowchart of a method of operating a power conversion system according to the present disclosure.

Reference is made to FIG. 12 which is a flowchart of a method of operating a power conversion system according to the present disclosure. The power conversion system converts a DC input voltage into an AC output voltage. The method includes following steps. First, an input capacitor bank is provided to receive the DC input voltage. The input capacitor bank has a first capacitor and a second capacitor, and the first capacitor and the second capacitor are connected to a neutral point (S10). Afterward, a first conversion circuit connected in parallel to the input capacitor bank is provided (S20). The first conversion circuit has a first branch, a second branch, and a first auxiliary branch. The first branch is composed of a first power switch and a first diode connected to the first power switch; the second branch is composed of a second power switch and a second diode connected to the second power switch. The first auxiliary branch is composed of a first auxiliary power switch and a first auxiliary diode connected to the first auxiliary power switch. In particular, the first auxiliary branch is connected between the first branch and the second branch. The control circuit produces a first control signal to control the first power switch and the second power switch, and produces a first auxiliary control signal to control the first auxiliary power switch.

Afterward, a second conversion circuit connected in parallel to the input capacitor bank is provided (S30). The second conversion circuit has a third branch, a fourth branch, and a second auxiliary branch. The third branch is composed of a third power switch and a third diode connected to the third power switch; the fourth branch is composed of a fourth power switch and a fourth diode connected to the fourth power switch. The second auxiliary branch is composed of a second auxiliary power switch and a second auxiliary diode connected to the second auxiliary power switch. In particular, the second auxiliary branch is connected between the third branch and the fourth branch. The control circuit produces a second control signal to control the third power switch and the fourth power switch, and produces a second auxiliary control signal to control the second auxiliary power switch.

Afterward, a first filtering circuit connected between the first conversion circuit and the second conversion circuit is provided, and an output side of the first filtering circuit is connected to the neutral point (S40). The first filtering circuit has a first output inductor with a first terminal and a second terminal, a second output inductor with a first terminal and a second terminal, and a first output capacitor with a first terminal and a second terminal. The first terminal of the first output inductor is connected to the first terminal of the second output inductor and then connected to the first terminal of the first output capacitor. The second terminal of the first output inductor is connected to the first power switch, the first auxiliary power switch, and the first diode. The second terminal of the second output inductor is connected to the fourth power switch and the second auxiliary diode. The second terminal of the first output capacitor is connected to the neutral point.

Afterward, a second filtering circuit connected between the first conversion circuit and the second conversion circuit is provided, and an output side of the second filtering circuit is connected to the neutral point (S50). The second filtering circuit has a third output inductor with a first terminal and a second terminal, a fourth output inductor with a first terminal and a second terminal, and a second output capacitor with a first terminal and a second terminal. The first terminal of the third output inductor is connected to the first terminal of the fourth output inductor and then connected to the first terminal of the second output capacitor. The second terminal of the fourth output inductor is connected to the third power switch, the second auxiliary power switch, and the third diode. The second terminal of the third output inductor is connected to the second power switch and the first auxiliary diode. The second terminal of the second output capacitor is connected to the neutral point.

Finally, a control circuit is provided to produce a plurality of control signals to correspondingly control the first conversion circuit and the second conversion circuit, thus reducing leakage current of the DC input voltage caused by parasitic capacitance voltage (S60).

When the AC output voltage is under the positive half-cycle operation and the first output inductor and the third output inductor are under an energy-storing operation because the first power switch and the second power switch are turned on by the first control signal in the high-frequency switching manner and the first auxiliary power switch is turned on by the first auxiliary control signal in the low-frequency high-level manner, a positive half-cycle energy-storing loop is sequentially formed by the DC input voltage, the first power switch, the first output inductor, the AC output voltage, the third output inductor, the second power switch, and the DC input voltage.

When the AC output voltage is under the positive half-cycle operation and the first output inductor and the third output inductor are under an energy-releasing operation because the first power switch and the second power switch are turned off by the first control signal in the high-frequency switching manner and the first auxiliary power switch is turned on by the first auxiliary control signal in the low-frequency high-level manner, a positive half-cycle energy-releasing loop is sequentially formed by the first output inductor, the AC output voltage, the third output inductor, the first auxiliary diode, the first auxiliary power switch, and the first output inductor.

When the AC output voltage is under the negative half-cycle operation and the second output inductor and the fourth output inductor are under an energy-storing operation because the third power switch and the fourth power switch are turned on by the second control signal in the high-frequency switching manner and the second auxiliary power switch is turned on by the second auxiliary control signal in the low-frequency high-level manner, a negative half-cycle energy-storing loop is sequentially formed by the DC input voltage, the third power switch, the fourth output inductor, the AC output voltage, the second output inductor, the fourth power switch, and the DC input voltage.

When the AC output voltage is under the negative half-cycle operation and the second output inductor and the fourth output inductor are under an energy-releasing operation because the third power switch and the fourth power switch are turned off by the second control signal in the high-frequency switching manner and the second auxiliary power switch is turned on by the second auxiliary control signal in the low-frequency high-level manner, a negative half-cycle energy-releasing loop is sequentially formed by the fourth output inductor, the AC output voltage, the second output inductor, the second auxiliary diode, the second auxiliary power switch, and the fourth output inductor.

In conclusion, the present disclosure has following advantage:

The dual-buck inverter, composed of the first conversion circuit 11, the second conversion circuit 12, the first filtering circuit 21, and the second filtering circuit 22, is used to provide energy-storing and energy-releasing loops of the first output inductor L1, the second output inductor L2, the third output inductor L3, and the fourth output inductor L4. In addition, the first filtering circuit 21 and the second filtering circuit 22 are connected to the neutral point Po at the DC input side, thus significantly reducing leakage current of the DC input voltage Vdc caused by parasitic capacitance voltage.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion system configured to convert a DC input voltage into an AC output voltage; the power conversion system comprising:
    an input capacitor bank having a first capacitor and a second capacitor, and the first capacitor and the second capacitor connected to a neutral point and configured to receive the DC input voltage;
    a first conversion circuit connected in parallel to the input capacitor bank;
    a second conversion circuit connected in parallel to the input capacitor bank;
    a first filtering circuit connected between the first conversion circuit and the second conversion circuit, and an output side of the first filtering circuit connected to the neutral point;
    a second filtering circuit connected between the first conversion circuit and the second conversion circuit, and an output side of the second filtering circuit connected to the neutral point; and
    a control circuit configured to produce a plurality of control signals to correspondingly control the first conversion circuit and the second conversion circuit, thus reducing leakage current of the DC input voltage caused by parasitic capacitance voltage,
    wherein the first conversion circuit comprises a first branch, a second branch, and a first auxiliary branch; the first branch comprises a first power switch and a first diode connected to the first power switch; the second branch comprises a second power switch and a second diode connected to the second power switch; the first auxiliary branch comprises a first auxiliary power switch and a first auxiliary diode connected to the first auxiliary power switch; the first auxiliary branch is connected between the first branch and the second branch; the control circuit is configured to produce a first control signal to control the first power switch and the second power switch, and produce a first auxiliary control signal to control the first auxiliary power switch.

2. The power conversion system in claim 1, wherein the second conversion circuit comprises a third branch, a fourth branch, and a second auxiliary branch; the third branch comprises a third power switch and a third diode connected to the third power switch; the fourth branch comprises a fourth power switch and a fourth diode connected to the fourth power switch; the second auxiliary branch comprises a second auxiliary power switch and a second auxiliary diode connected to the second auxiliary power switch; the second auxiliary branch is connected between the third branch and the fourth branch; the control circuit is configured to produce a second control signal to control the third power switch and the fourth power switch, and produce a second auxiliary control signal to control the second auxiliary power switch.

3. The power conversion system in claim 2, wherein the first filtering circuit comprises a first output inductor with a first terminal and a second terminal, a second output inductor with a first terminal and a second terminal, and a first output capacitor with a first terminal and a second terminal; the first terminal of the first output inductor is connected to the first terminal of the second output inductor and then connected to the first terminal of the first output capacitor; the second terminal of the first output inductor is connected to the first power switch, the first auxiliary power switch, and the first diode; the second terminal of the second output inductor is connected to the fourth power switch and the second auxiliary diode; the second terminal of the first output capacitor is connected to the neutral point; the second filtering circuit comprises a third output inductor with a first terminal and a second terminal, a fourth output inductor with a first terminal and a second terminal, and a second output capacitor with a first terminal and a second terminal; the first terminal of the third output inductor is connected to the first terminal of the fourth output inductor and then connected to the first terminal of the second output capacitor; the second terminal of the fourth output inductor is connected to the third power switch, the second auxiliary power switch, and the third diode; the second terminal of the third output inductor is connected to the second power switch and the first auxiliary diode; the second terminal of the second output capacitor is connected to the neutral point.

4. The power conversion system in claim 2, wherein the control circuit comprises:
   a signal inverting unit;
   a first AND gate unit;
   a second AND gate unit;
   a NOT gate unit;
   a first comparison unit having an inverting input terminal, a non-inverting input terminal, and an output terminal; wherein the non-inverting input terminal is configured to receive an AC output voltage signal and the inverting input terminal is configured to receive a triangular carrier signal; the output terminal is configured to output a first output signal;
   a second comparison unit having an inverting input terminal, a non-inverting input terminal, and an output terminal; wherein the non-inverting input terminal is connected to the signal inverting unit to receive the AC output voltage signal and the inverting input terminal is configured to receive the triangular carrier signal; the output terminal is configured to output a second output signal; and
   a third comparison unit having an inverting input terminal, a non-inverting input terminal, and an output terminal; wherein the non-inverting input terminal is connected to receive the AC output voltage signal and the inverting input terminal is grounded; the output terminal is configured to output the first auxiliary control signal and the output terminal is connected to the NOT gate unit to output the second auxiliary control signal;
   wherein the first AND gate unit is configured to receive the first output signal and the first auxiliary control signal to output the first control signal; the second AND gate unit is configured to receive the second output signal and the second auxiliary control signal to output the second control signal; wherein the triangular carrier signal is a high-frequency carrier signal.

5. The power conversion system in claim 4, wherein when the AC output voltage is under a positive half-cycle operation, the first control signal is a high-frequency switching signal, the second control signal is a low-level signal, the first auxiliary control signal is a low-frequency high-level signal, and the second auxiliary control signal is a low-frequency low-level signal; when the AC output voltage is under a negative half-cycle operation, the first control signal is a low-level signal, the second control signal is a high-frequency switching signal, the first auxiliary control signal is a low-frequency low-level signal, and the second auxiliary control signal is a low-frequency high-level signal.

6. The power conversion system in claim 5, wherein when the AC output voltage is under the positive half-cycle operation and the first output inductor and the third output inductor are under an energy-storing operation because the first power switch and the second power switch are turned on by the first control signal in the high-frequency switching manner and the first auxiliary power switch is turned on by the first auxiliary control signal in the low-frequency high-level manner, a positive half-cycle energy-storing loop is sequentially formed by the DC input voltage, the first power switch, the first output inductor, the AC output voltage, the third output inductor, the second power switch, and the DC input voltage.

7. The power conversion system in claim 5, wherein when the AC output voltage is under the positive half-cycle operation and the first output inductor and the third output inductor are under an energy-releasing operation because the first power switch and the second power switch are turned off by the first control signal in the high-frequency switching manner and the first auxiliary power switch is turned on by the first auxiliary control signal in the low-frequency high-level manner, a positive half-cycle energy-releasing loop is sequentially formed by the first output inductor, the AC output voltage, the third output inductor, the first auxiliary diode, the first auxiliary power switch, and the first output inductor.

8. The power conversion system in claim 5, wherein when the AC output voltage is under the negative half-cycle operation and the second output inductor and the fourth output inductor are under an energy-storing operation because the third power switch and the fourth power switch are turned on by the second control signal in the high-frequency switching manner and the second auxiliary power switch is turned on by the second auxiliary control signal in the low-frequency high-level manner, a negative half-cycle energy-storing loop is sequentially formed by the DC input voltage, the third power switch, the fourth output inductor, the AC output voltage, the second output inductor, the fourth power switch, and the DC input voltage.

9. The power conversion system in claim 5, wherein when the AC output voltage is under the negative half-cycle operation and the second output inductor and the fourth output inductor are under an energy-releasing operation because the third power switch and the fourth power switch are turned off by the second control signal in the high-frequency switching manner and the second auxiliary power switch is turned on by the second auxiliary control signal in the low-frequency high-level manner, a negative half-cycle energy-releasing loop is sequentially formed by the fourth output inductor, the AC output voltage, the second output inductor, the second auxiliary diode, the second auxiliary power switch, and the fourth output inductor.

10. A method of operating a power conversion system configured to convert a DC input voltage into an AC output voltage, the method comprising following steps:
(a) providing an input capacitor bank to receive the DC input voltage; wherein the input capacitor bank has a first capacitor and a second capacitor, and the first capacitor and the second capacitor are connected to a neutral point;
(b) providing a first conversion circuit connected in parallel to the input capacitor bank;
(c) providing a second conversion circuit connected in parallel to the input capacitor bank;
(d) providing a first filtering circuit connected between the first conversion circuit and the second conversion circuit; wherein an output side of the first filtering circuit is connected to the neutral point;
(e) providing a second filtering circuit connected between the first conversion circuit and the second conversion circuit; wherein an output side of the second filtering circuit is connected to the neutral point; and
(f) providing a control circuit to produce a plurality of control signals to correspondingly control the first conversion circuit and the second conversion circuit, thus reducing leakage current of the DC input voltage caused by parasitic capacitance voltage,
wherein the first conversion circuit comprises a first branch, a second branch, and a first auxiliary branch; the first branch comprises a first power switch and a first diode connected to the first power switch; the second branch comprises a second power switch and a second diode connected to the second power switch; the first auxiliary branch comprises a first auxiliary power switch and a first auxiliary diode connected to the first auxiliary power switch; the first auxiliary branch is connected between the first branch and the second branch; the control circuit is configured to produce a first control signal to control the first power switch and the second power switch, and produce a first auxiliary control signal to control the first auxiliary power switch.

11. The method of operating a power conversion system in claim 10, wherein the second conversion circuit comprises a third branch, a fourth branch, and a second auxiliary branch; the third branch comprises a third power switch and a third diode connected to the third power switch; the fourth branch comprises a fourth power switch and a fourth diode connected to the fourth power switch; the second auxiliary branch comprises a second auxiliary power switch and a second auxiliary diode connected to the second auxiliary power switch; the second auxiliary branch is connected between the third branch and the fourth branch; the control circuit is configured to produce a second control signal to control the third power switch and the fourth power switch, and produce a second auxiliary control signal to control the second auxiliary power switch.

12. The method of operating a power conversion system in claim 11, wherein the first filtering circuit comprises a first output inductor with a first terminal and a second terminal, a second output inductor with a first terminal and a second terminal, and a first output capacitor with a first terminal and a second terminal; the first terminal of the first output inductor is connected to the first terminal of the second output inductor and then connected to the first terminal of the first output capacitor; the second terminal of the first output inductor is connected to the first power switch, the first auxiliary power switch, and the first diode; the second terminal of the second output inductor is connected to the fourth power switch and the second auxiliary diode; the second terminal of the first output capacitor is connected to the neutral point; the second filtering circuit comprises a third output inductor with a first terminal and a second terminal, a fourth output inductor with a first terminal and a second terminal, and a second output capacitor with a first terminal and a second terminal; the first terminal of the third output inductor is connected to the first terminal of the fourth output inductor and then connected to the first terminal of the second output capacitor; the second terminal of the fourth output inductor is connected to the third power switch, the second auxiliary power switch, and the third diode; the second terminal of the third output inductor is connected to the second power switch and the first auxiliary diode; the second terminal of the second output capacitor is connected to the neutral point.

13. The method of operating a power conversion system in claim 11, wherein the control circuit comprises:
a signal inverting unit;
a first AND gate unit;
a second AND gate unit;
a NOT gate unit;
a first comparison unit having an inverting input terminal, a non-inverting input terminal, and an output terminal; wherein the non-inverting input terminal is configured to receive an AC output voltage signal and the inverting input terminal is configured to receive a triangular carrier signal; the output terminal is configured to output a first output signal;
a second comparison unit having an inverting input terminal, a non-inverting input terminal, and an output terminal; wherein the non-inverting input terminal is connected to the signal inverting unit to receive the AC output voltage signal and the inverting input terminal is configured to receive the triangular carrier signal; the output terminal is configured to output a second output signal; and
a third comparison unit having an inverting input terminal, a non-inverting input terminal, and an output terminal; wherein the non-inverting input terminal is connected to receive the AC output voltage signal and the inverting input terminal is grounded; the output terminal is configured to output the first auxiliary control signal and the output terminal is connected to the NOT gate unit to output the second auxiliary control signal;
wherein the first AND gate unit is configured to receive the first output signal and the first auxiliary control signal to output the first control signal; the second AND gate unit is configured to receive the second output signal and the second auxiliary control signal to output the second control signal; wherein the triangular carrier signal is a high-frequency carrier signal.

14. The method of operating a power conversion system in claim 13, wherein when the AC output voltage is under a positive half-cycle operation, the first control signal is a high-frequency switching signal, the second control signal is a low-level signal, the first auxiliary control signal is a low-frequency high-level signal, and the second auxiliary control signal is a low-frequency low-level signal; when the AC output voltage is under a negative half-cycle operation, the first control signal is a low-level signal, the second control signal is a high-frequency switching signal, the first auxiliary control signal is a low-frequency low-level signal, and the second auxiliary control signal is a low-frequency high-level signal.

15. The method of operating a power conversion system in claim 14, wherein when the AC output voltage is under the positive half-cycle operation and the first output inductor and the third output inductor are under an energy-storing operation because the first power switch and the second power switch are turned on by the first control signal in the high-frequency switching manner and the first auxiliary power switch is turned on by the first auxiliary control signal in the low-frequency high-level manner, a positive half-cycle energy-storing loop is sequentially formed by the DC input voltage, the first power switch, the first output inductor, the AC output voltage, the third output inductor, the second power switch, and the DC input voltage.

16. The method of operating a power conversion system in claim 14, wherein when the AC output voltage is under the positive half-cycle operation and the first output inductor and the third output inductor are under an energy-releasing operation because the first power switch and the second power switch are turned off by the first control signal in the high-frequency switching manner and the first auxiliary power switch is turned on by the first auxiliary control signal in the low-frequency high-level manner, a positive half-cycle energy-releasing loop is sequentially formed by the first output inductor, the AC output voltage, the third output inductor, the first auxiliary diode, the first auxiliary power switch, and the first output inductor.

17. The method of operating a power conversion system in claim 14, wherein when the AC output voltage is under the negative half-cycle operation and the second output inductor and the fourth output inductor are under an energy-storing operation because the third power switch and the fourth power switch are turned on by the second control signal in the high-frequency switching manner and the second auxiliary power switch is turned on by the second auxiliary control signal in the low-frequency high-level manner, a negative half-cycle energy-storing loop is sequentially formed by the DC input voltage, the third power switch, the fourth output inductor, the AC output voltage, the second output inductor, the fourth power switch, and the DC input voltage.

18. The method of operating a power conversion system in claim 14, wherein when the AC output voltage is under the negative half-cycle operation and the second output inductor and the fourth output inductor are under an energy-releasing operation because the third power switch and the fourth power switch are turned off by the second control signal in the high-frequency switching manner and the second auxiliary power switch is turned on by the second auxiliary control signal in the low-frequency high-level manner, a negative half-cycle energy-releasing loop is sequentially formed by the fourth output inductor, the AC output voltage, the second output inductor, the second auxiliary diode, the second auxiliary power switch, and the fourth output inductor.

* * * * *